United States Patent [19]

Cheng et al.

[11] Patent Number: 5,544,322
[45] Date of Patent: Aug. 6, 1996

[54] SYSTEM AND METHOD FOR POLICY-BASED INTER-REALM AUTHENTICATION WITHIN A DISTRIBUTED PROCESSING SYSTEM

[75] Inventors: Pau-Chen Cheng, Yorktown Heights, N.Y.; Shyh-Wei Luan, San Jose, Calif.

[73] Assignee: International Business Machines Corporation, Armonk, N.Y.

[21] Appl. No.: 239,669

[22] Filed: May 9, 1994

[51] Int. Cl.$^6$ .............................. G06F 13/14; H04L 9/00; H04L 12/22
[52] U.S. Cl. .......................... 395/200.12; 380/25; 380/49; 364/286.5; 340/825.34
[58] Field of Search .......................... 395/200.02, 200.06, 395/200.12; 380/49, 25, 23, 4; 364/286.5; 340/825.31, 825.34

[56] References Cited

U.S. PATENT DOCUMENTS

| | | | |
|---|---|---|---|
| 4,309,569 | 1/1982 | Merkle | 340/825.34 |
| 4,317,957 | 3/1982 | Sendrow | 340/825.34 |

(List continued on next page.)

FOREIGN PATENT DOCUMENTS

| | | |
|---|---|---|
| 0112944A1 | 12/1982 | European Pat. Off. . |
| 0148960A1 | 12/1983 | European Pat. Off. . |
| 0304033 | 8/1988 | European Pat. Off. . |
| 0325777A2 | 12/1988 | European Pat. Off. . |
| 0398492A2 | 4/1990 | European Pat. Off. . |
| 0481121 | 10/1990 | European Pat. Off. . |
| 0456386A2 | 4/1991 | European Pat. Off. . |
| 0502446 | 2/1992 | European Pat. Off. . |
| 0520709A2 | 6/1992 | European Pat. Off. . |
| 0534673A2 | 9/1992 | European Pat. Off. . |
| 0558326A1 | 2/1993 | European Pat. Off. . |
| 2619941 | 3/1989 | France . |
| 4-264864 | 9/1992 | Japan . |
| 5-035678 | 2/1996 | Japan . |
| WO92/04671 | 3/1992 | WIPO . |
| WO93/17529 | 9/1993 | WIPO . |

OTHER PUBLICATIONS

Robinson, J. T. "Shared Object Server for Multi-user Computer Workstations," *IBM Technical Disclosure Bulletin*, vol. 31, No. 1, Jun. 1988, pp. 355–358.

N. Camillone, et al. "Extensible User Authentication in a Computer Operating System," *IBM Technical Disclosure Bulletin*, vol. 34, No. 9, Feb. 1992, pp. 480–482.

J. H. Austin, et al. "Definition of Directory Service Authorization Levels," *IBM Technical Disclosure Bulletin*, vol. 33, No. 8, Jan. 1991, pp. 428–429.

J. H. Austin, et al. "Assignment of Detailed Privileges for Directory Administrators," *IBM Technical Disclosure Bulletin*, vol. 33, No. 8, Jan. 1991, pp. 424–427.

B. G. Lindsay. "Extending Nodes in a Network," *IBM Technical Disclosure Bulletin*, vol. 26, No. 10B, Mar. 1984, pp. 5397–5399.

"Session–based Secure Communication for Secure Xenix," *IBM Technical Disclosure Bulletin*, vol. 32, No. 9A, Feb. 1990, pp. 239–243.

Butler Lampson, et al. "Authentication in Distributed Systems: Theory and Practice," *ACM Transactions on Computer Systems*, vol. 10, No. 4, Nov. 1992, pp. 265–310.

Joseph N. Pato. "Hierarchical Inter–Cell Trust," Jul. 1992, pp. 1–3.

John Kohl and B. Clifford Neuman. "The Kerberos® Network Authentication Service (V5)" Internet–Draft, Sep. 1, 1992, pp. 1–3 and 13–17.

Virgil D. Gligor, et al. "On Inter–realm Authentication in Large Distributed Systems," *IEEE*, 1992, pp. 2–17.

*Primary Examiner*—Alyssa H. Bowler
*Assistant Examiner*—Mark H. Rinehart
*Attorney, Agent, or Firm*—Richard M. Ludwin; Jenkens & Gilchrist, P.C.

[57] ABSTRACT

A system and method for defining a platform-independent policy framework for authentication of principals to servers in another realm, within a distributed data processing system. The present invention may be implemented on top of the Kerberos protocol, or any trusted third party network authentication protocol with inter-realm authentication mechanisms.

9 Claims, 4 Drawing Sheets

U.S. PATENT DOCUMENTS

| | | | |
|---|---|---|---|
| 4,326,098 | 4/1982 | Bouricius et al. | 380/49 |
| 4,423,287 | 12/1983 | Zeidler | 340/825.34 |
| 4,500,750 | 2/1985 | Elander et al. | 380/25 |
| 4,661,658 | 4/1987 | Matyas | 380/23 |
| 4,672,572 | 6/1987 | Alsberg | 380/23 |
| 4,725,719 | 2/1988 | Oncken et al. | |
| 4,755,940 | 7/1988 | Brachtl et al. | 340/825.34 |
| 4,918,653 | 4/1990 | Johri et al. | 340/825.31 |
| 4,919,545 | 4/1990 | Yu | 380/25 |
| 5,001,755 | 3/1991 | Skret | |
| 5,020,105 | 5/1994 | Rosen et al. | 380/49 |
| 5,032,979 | 7/1991 | Hecht et al. | 380/25 |
| 5,109,483 | 4/1992 | Baratz et al. | 395/200.12 |
| 5,115,466 | 5/1992 | Presttun | 380/49 |
| 5,173,589 | 12/1992 | Diehl et al. | |
| 5,175,851 | 12/1992 | Johnson et al. | 364/286.5 |
| 5,181,238 | 1/1993 | Medamana et al. | |
| 5,191,650 | 3/1993 | Kramer et al. | 395/200.12 |
| 5,198,806 | 3/1993 | Lord | 340/825.31 |
| 5,202,921 | 4/1993 | Herzberg et al. | 380/23 |
| 5,204,902 | 4/1993 | Reeds, III et al. | 380/23 |
| 5,204,961 | 4/1993 | Barlow | 380/25 |
| 5,208,858 | 5/1993 | Vollert et al. | 380/23 |
| 5,220,603 | 6/1993 | Parker | 380/25 |
| 5,220,604 | 6/1993 | Gasser et al. | 380/49 |
| 5,224,164 | 6/1993 | Elsner | |
| 5,226,079 | 7/1993 | Holloway | 380/49 |
| 5,235,642 | 8/1993 | Wobber et al. | 380/25 |
| 5,237,612 | 8/1993 | Raith | 380/23 |
| 5,237,614 | 8/1993 | Weiss | 380/23 |
| 5,249,230 | 9/1993 | Mihm, Jr. | 380/23 |
| 5,253,295 | 10/1993 | Saada et al. | 380/23 |
| 5,261,002 | 11/1993 | Perlman et al. | 380/49 |
| 5,263,157 | 11/1993 | Janis | 380/25 |
| 5,272,754 | 12/1993 | Boerbert | 380/25 |
| 5,276,444 | 1/1994 | McNair | 340/825.31 |
| 5,276,735 | 1/1994 | Boebert et al. | 380/49 |
| 5,276,901 | 1/1994 | Howell et al. | 340/825.31 |
| 5,339,403 | 8/1994 | Parker | 380/25 |
| 5,349,643 | 9/1994 | Cox et al. | 380/49 |

SYSTEM AND METHOD FOR POLICY-BASED INTER-REALM AUTHENTICATION WITHIN A DISTRIBUTED PROCESSING SYSTEM

TECHNICAL FIELD OF THE INVENTION

This invention relates to data processing networks, and more particularly, to a system and method for providing a network authentication protocol.

BACKGROUND OF THE INVENTION

Large distributed computing systems often partition their computational and administrative resources into autonomous units called realms. An entity with its own identity, called a principal, registers its identity with a realm. Examples of principals are a human user of distributed computing systems, a program running on a computer system, a computer system, or a realm itself.

A principal can provide services to other principals, usually through a program running on a computer system. In this case, the principal is called a server and the principals requesting/receiving services are called clients.

Each realm has a server called an authentication server. Suppose two principals, A and B, both register with realm X; and principal A wishes to authenticate (the process of identifying and verifying a principal on the network) itself to principal B. Principal A can do so by requesting realm X's authentication server to generate a certificate. Pertaining to the certificate, a key is also sent to principal A secretly by the authentication server. The knowledge of the key is required to use the certificate correctly. Thus, when principal B is presented with the certificate from principal A, principal B can prove principal A's identity. Realm X's authentication server can generate such a certificate because both principals A and B have registered with realm X, and a realm's authentication server is trusted to certify its registered principals. The Kerberos network authentication protocol, as described within *The Kerberos Network Authentication Service* (V5), by John Kohl and B. Clifford Neuman, *Internet Draft*, September 1992, is an example of protocols carrying out such authentication.

A problem arises when principal B is registered with realm Y and not realm X. In this case, neither realm X's nor realm Y's authentication server can generate a certificate for principal A to authenticate itself to principal B. The following references, which are incorporated by reference herein, are all descriptions of prior art attempts to solve this problem: *The Kerberos Network Authentication Service* (V5), by John Kohl and B. Clifford Neuman, Internet Draft, September 1992; *Authentication in Distributed Systems: Theory and Practice,* by Butler Lampson, Martin Abadi, Michael Burrows, and Edward Wober, ACM Trans. on Computer Systems, 10(4), November 1992; *On Inter-realm Authentication of Large Distributed Systems,* by Virgil D. Gligor, Shyh-Wei Luan and Joseph N. Pato, In Proc. of IEEE Computer Society Symposium on Research in Security and Privacy, May 1992; and *Hierarchial Trust Relationship for Inter-Cell Authentication,* by Joseph N. Pato, OSF/DCE RFC 7.0, Open Software Foundation, July 1992. All these attempted solutions are based on some sort of "co-signature" scheme, which works in the following way:

1. Find a sequence of intermediate realms, R0, R1, ..., Rn, such that
    (a) Realm X is realm R0,
    (b) Realm Y is realm Rn,
    (c) Realm Ri registers with realm R(i+1) and realm R(i+1) registers with realm Ri, with i=0, ... (n−1),
    (d) The sequence of realms R0, R1, ..., Rn, is referred to as an "authentication path".

2. Principal A requests realm X's authentication server to generate certificate C0 to authenticate principal A to realm R1.

3. Principal A requests realm R1's authentication server to generate a new certificate C1 based on certificate C0. Certificate C1, in effect, is a combination of certificate C0 and another certificate which states: realm R1's authentication server certifies that certificate C0 is generated by realm X's authentication server. Certificate C1 is generated in such a way that realm R2's authentication server can verify that certificate C1 is generated by realm R1's authentication server. Certificate C1 can be generated in such a way because realm R1 has registered with realm R2. Certificate C1 can be considered as "certificate C0 co-signed by realm R1's authentication server."

4. By repeating steps similar to 3, principal A requests certificate Ci from realm Ri's authentication server. Each certificate Ci is generated by realm Ri's authentication server, and certifies that certificate C(i−1) is generated by realm R(i−1)'s authentication server. Therefore, each certificate Ci can be considered as "certificate C(i−1) co-signed by realm Ri's authentication server."

5. Principal A eventually acquires certificate Cn and presents certificate Cn to principal B so as to authenticate itself to principal B. Note that certificate Cn is "co-signed" by realms R0, R1, ..., Rn.

Three problems need to be addressed in the above co-signature scheme:

1. A mechanism should be provided for a server to specify its own policy on what kinds of authentication paths are trustworthy to itself and to announce the policy to its clients. A server may choose to reject authentication paths that do not comply with its announced policy.

2. A mechanism should be provided for a client to specify its own policy on what kinds of authentication paths through which it would like to traverse to reach the server's realm.

3. A mechanism should be provided for a client to find an authentication path that complies with both the server's policy and the client's policy (if such a path exists).

None of the prior art solutions cited above provides these policy mechanisms. Furthermore, applications based on these solutions have to devise their own policy mechanism. Additionally, repetitive or incompatible mechanisms may result. Also note that the prior art solutions allow only hierarchical authentication paths to be automatically routed (a hierarchical authentication path is an authentication path that traverses realms within at most two realm hierarchies, where every realm is trusted to authenticate its descendants to its ancestor and to authenticate its ancestor or peers in cross-linked hierarchies to its descendants. A realm hierarchy would usually contain an autonomous unit such as an enterprise, an organization, or a university). Moreover, applications that use authentication paths that involve more than two realm hierarchies would have to devise their own routing mechanisms.

Thus, there is a need in the art for an authentication protocol, which allows a target server to publish (announce) its authentication policy to the network. There is a further need in the art for an authentication protocol that does not impose a particular structure, relationship, or hierarchy on the various realms within the data processing network. There is yet another need in the art for such a protocol that allows a client to specify its own policy on what types of authentication paths it wishes to traverse to a particular server's realm. Additionally, there is a need in the art for an authentication protocol that provides an authentication path to a client, which complies with the authentication policies of the target server and policies specified by the client.

SUMMARY OF THE INVENTION

Accordingly, it is an object of the present invention to provide a system and method for defining a platform-independent framework for a trusted third-party network authentication protocol that permits a client requesting the services of a target server to derive a valid authentication path that complies with the authentication policy of the target server, and if necessary, the policy specified by the client.

It is a further object of the present invention to provide an authentication protocol within a data processing network that permits a server to issue its authentication policy without being subject to a particular structure or hierarchy for authentication within the network.

In the attainment of the above objects, the present invention provides a system and method for authenticating a principal residing within a first realm to a second principal residing within a second realm. Authentication policies of particular principals within the network are received from each principal for use in the inter-realm authentication process. The policy announcements are stored within database servers, which send the authentication policies of particular application servers to clients upon a query by a particular client, which desires to interact with the application server. The client, upon acquiring a server's policy by querying the policy server, requests routing information from an authentication routing server which provides an authentication path compliant with the authentication policy of the target server, and if necessary or desired, the policies specified by the client.

The authentication routing server configures the authentication paths through interaction with authentication servers, which also provides an authentication certificate to the client, which conforms to the received authentication path. The client then sends the request along with the authentication certificate through the network as specified by the authentication path to the target server.

The methods, techniques, and data structures described herein may be implemented by loading one or more sequences of program statements from a program storage device (e.g., a computer type, a magnetic or optical disk storage device, or other storage means) into the memory or memories of a digital computer or computers configured as described herein and causing the computer(s) to execute program sequences as appropriate. The design and development of specific program sequences is a matter of routine work for persons of ordinary skill (which of course should include familiarity of the computer(s), operating system(s), etc., that are selected for the implementation) who have the benefit of this disclosure.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the, accompanying drawings, in which.

DETAILED DESCRIPTION OF A PREFERRED EMBODIMENT OF THE INVENTION

Figure 1:
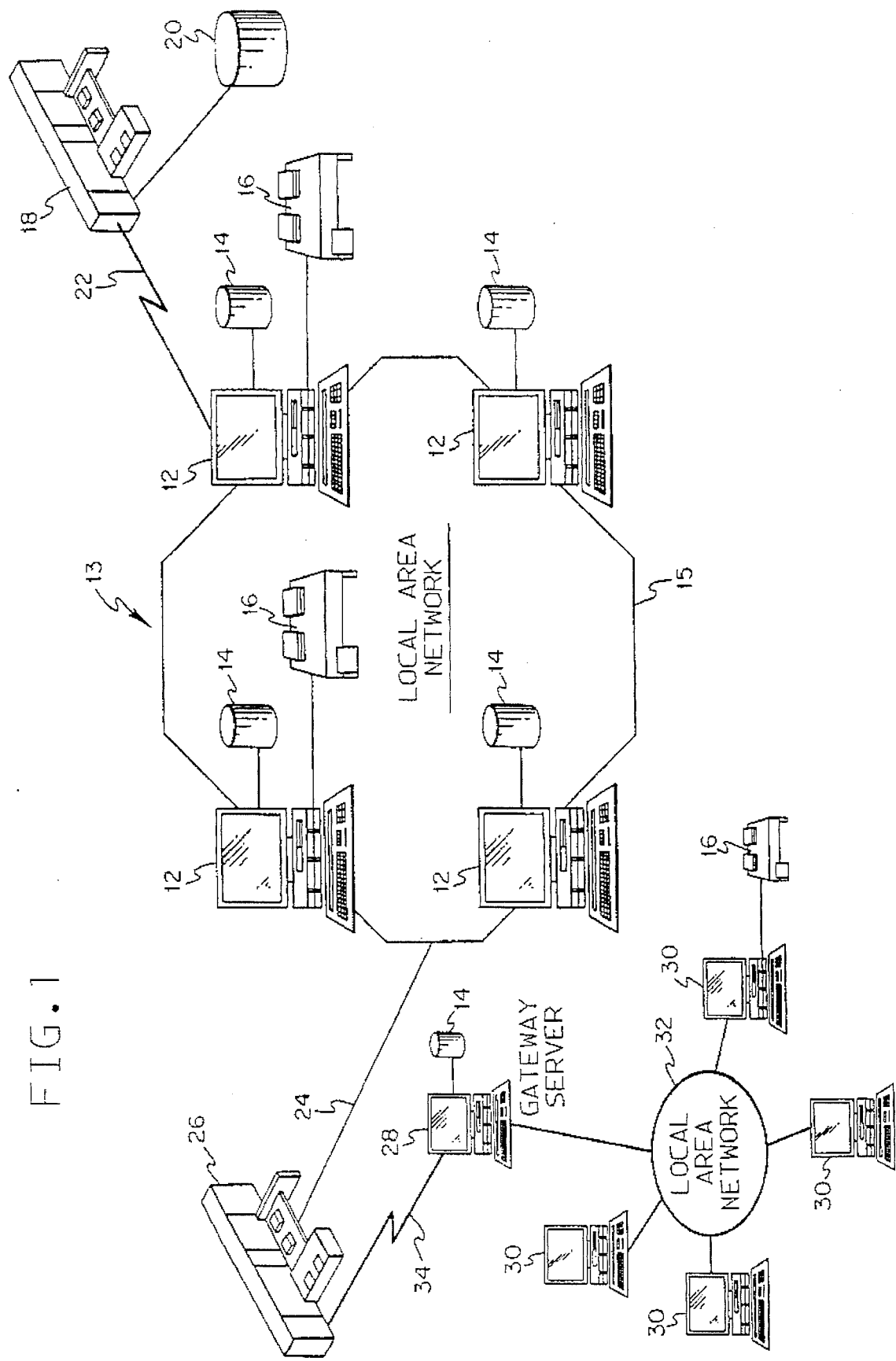
FIG. 1 is a pictorial representation of a distributed data processing system which may be utilized to implement the system and method of the present invention.

With reference now to the figures and in particular with reference to FIG. 1, there is depicted a pictorial representation of distributed data processing system 13 which may be utilized to implement the method and system of the present invention. As may be seen, distributed data processing system 13 may include a plurality of networks, such as Local Area Networks (LAN) 15 and 32, each of which preferably includes a plurality of individual computers 12 and 30, respectively. Of course, those skilled in the art will appreciate that a plurality of Intelligent Work Station (IWS) coupled to a host processor may be utilized to implement each such network.

As is common in such data processing systems, each individual computer may be coupled to a storage device 14 and/or a printer/output device 16. One or more such storage devices 14 may be utilized, in accordance with the method and system of the present invention, to store the various objects or documents which may be periodically accessed by a user having access to such objects or documents in a data processing system implemented library. Further, one or more such storage devices 14 may be utilized, as will be explained in greater detail herein, to store the various authentication policies which are utilized to implement the method and system of the present invention.

Still referring to FIG. 1, it may be seen that distributed data processing system 13 may also include mainframe computers, such as mainframe computer 18, which may be preferably coupled to Local Area Network (LAN) 15 by means of communications link 22. Mainframe computer 18 may be coupled to storage device 20, which may serve as remote storage for Local Area Network (LAN) 15 and may be coupled via communications controller 26 and communications link 34 to gateway server 28. Gateway server 28 is preferably an individual computer or Intelligent Work Station (IWS) which serves to link Local Area Network (LAN) 32 to Local Area Network (LAN) 15.

Within the discussion below, any of systems 12, 18, 26, 28 or 30 may operate as clients and/or servers. Additionally, LAN 32, LAN 15, and system 18 may each reside in separate realms. As a result, the present invention described herein may be utilized to authenticate, for example, computer 18 to one of computer 30 by providing an authentication path from computer 18 to computer 30.

The present invention may be implemented on top of the Kerberos protocol (or any trusted third-party network authentication protocol such as Kerberos) and any popular transport/network layer protocol (e.g. TCP/IP, an acronym for Transmission Control Protocol/Internet Protocol, a software protocol developed by the Department of Defense for communications between computers).

Figure 2:
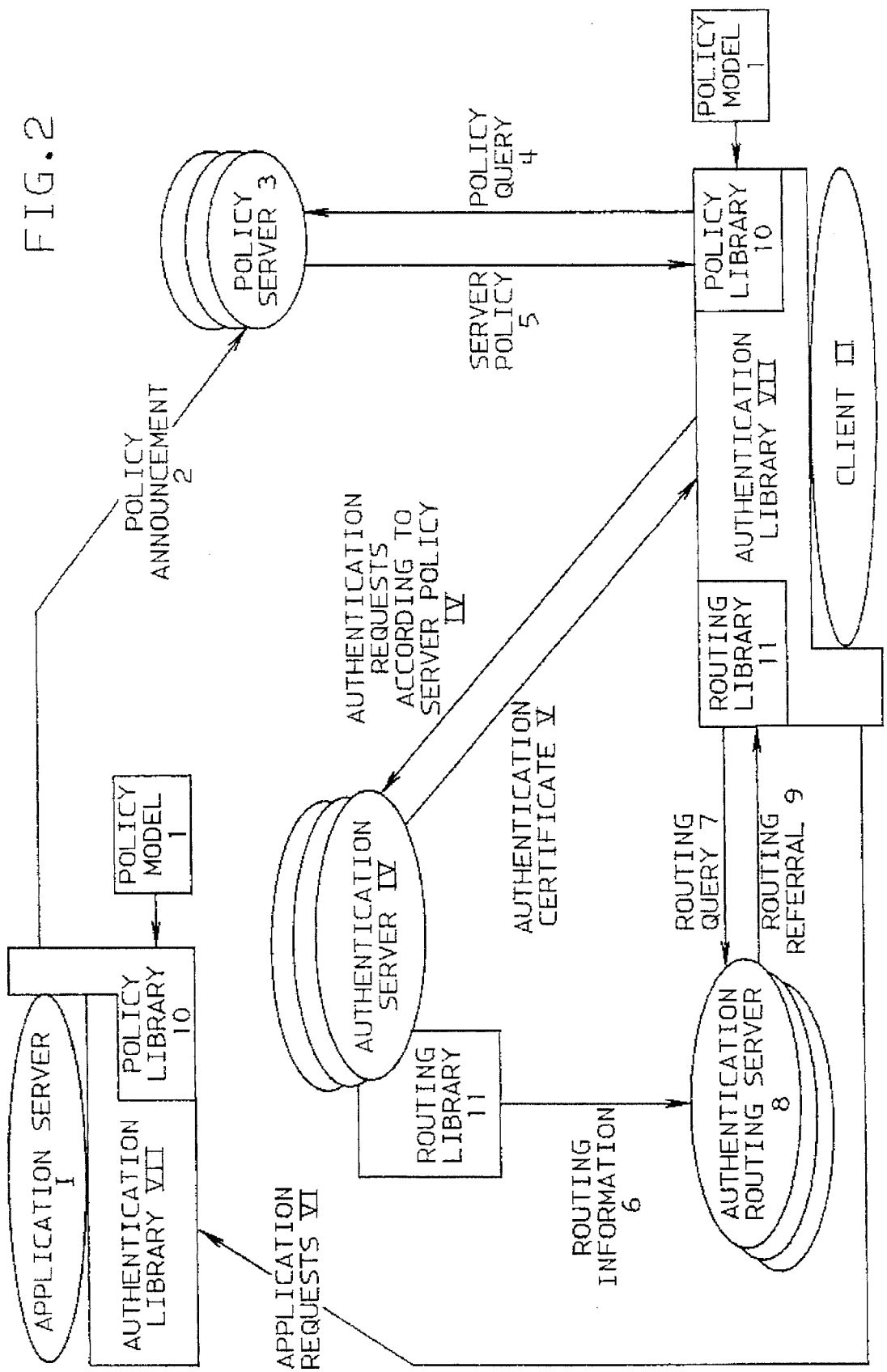
FIG. 2 illustrates a pictorial representation of the structure and the flow of information in accordance with the present invention.

Referring next to FIG. 2, there is illustrated a preferred embodiment of the present invention.

Application server I is a program running on a computer system (e.g., system 12, 18, 30, 26, or 28) to provide services to clients, such as client II, upon receiving a request from client II. Application server I has its own identity, which can be authenticated. Network printer servers and file servers are examples of application server I.

Client II is a program running on a computer system (e.g., system 12, 18, 26, 28, or 30) to seek services from application server I and other servers (not shown). Client II has its own identity which can be authenticated. Because client II can run on behalf of a human user and assumes the user's identity, human users are also considered clients who interact with distributed computing system 13 through a program running on his/her behalf.

Authentication server III is a program running on a computer system (e.g., system 12, 18, 26, 28, or 30). Each realm has its own authentication server III. A principal (e.g., client II, application server I, or other application servers) can register with the authentication server III of the principal's realm. Without help from a third party, authentication server III can directly authenticate principals, which are registered with the server. An authentication server III has its own identity which can be authenticated. Kerberos authentication servers ("AS") and ticket granting servers ("TGS") (please refer to the *Kerberos Network Authentication Service (V5)* reference noted above) are examples of authentication servers.

Authentication request IV is a request sent from a principal, such as client II, to authentication server III. Request IV is configured to request a certificate of the principal's (client II) identity. Kerberos AS requests and TGS requests are examples of authentication request IV.

Authentication certificate V is the reply from authentication server III to authentication request IV received from client II. Client II uses certificate V to authenticate itself to other principals. Kerberos ticket granting tickets ("TGT") and application tickets (please refer to the *Kerberos Network Authentication Service (V5)* reference noted above) are examples of authentication certificate V.

Application request VI is sent from client II to application server I. A typical application request VI will include authentication certificate V, particularly pertaining to client II, so as to authenticate client II to application server I.

Authentication libraries VII are each a set of application programming interfaces and their implementations which facilitate the communication between client II and authentication server III, and the communication between client II and application server I. The Kerberos library from project Athena of M.I.T. (please refer to the *Kerberos Network Authentication Service (V5)* reference noted above) is an example of authentication library VII.

Note, a program running on a computer system can be both a client and an application server simultaneously.

Policy model 1 is a set of rules, which define the syntax and semantics to formally specify the authentication policy of application server I. An authentication policy specifies what kind of authentication paths are trustworthy/acceptable. Below are three examples of authentication-policy specification.

EXAMPLE 1

An application server APS in realm Y may specify its policy as

"*<Realm U><Realm Y> OR *<Realm V><Realm Y>".

This policy states:

1. The last two realms on an authentication path to application server APS should be realm U and realm Y or realm V and realm Y;
2. The asterisk (*) means zero or more realms can be placed before the last two realms in the authentication path; and
3. No limit is placed on the total number of realms in the authentication path.

EXAMPLE 2

Application server APS in realm Y may specify its policy as

"*<Realm U><Realm Y>[limit=10]".

This policy states:

1. The last two realms on an authentication path to application server APS should be realm U and realm Y;
2. The asterisk (*) means zero or more realms can be placed before the last two realms in the authentication path; and
3. At most 10 realms can be placed in the authentication path.

EXAMPLE 3.

Application server APS in realm Y may specify its policy as "<Realm X>*<Realm Y>".

This policy states:

1. The first realm in the authentication path must be realm X;
2. The last realm in the authentication path must be realm Y; and
3. Zero or more realms can be placed between realm X and realm Y in the authentication path.

Usually, a server's authentication policy is decided by the person/organization who has authority over the server (e.g., the owner of the server, the administrator of the server). The concerns in deciding a policy usually include: security requirements, administration concerns, trustworthiness of other realms, liability, legal/business agreements among realms, etc. After a policy is decided, it is expressed in the language defined by a policy model. This expression is then translated to computer data structures by policy library 10 and sent to policy server 3. Policy announcement 2 is basically a message containing the above data structures.

Policy announcement 2 is the announcement of the authentication policy by application server I. Policy announcement 2 is sent from application server I to policy server 3. Policy announcement 2 is formally specified according to policy model 1.

Policy server 3 is a database server(s), which stores policy announcement 2 of the authentication policy of application server I, and sends the authentication policy to policy library 10 associated with client II in response to policy query 4 from client II.

Policy query 4 is a query from client II to policy server 3 to request the authentication policy of application server I stored within policy server 3.

Server policy 5 is a reply from policy server 3 to policy query 4 from client II. This reply contains either:

(a) an authentication policy of application server I, as formerly specified according to policy model 1, or (b) a referral to another policy server, or (c) an error message indicating the policy cannot be found.

Note, policy announcement 2 constitutes the protocol between application server I and policy server 3. Policy query 4 and server policy 5 constitute the protocol between client II and policy server 3.

Routing information 6 is sent from authentication server III to authentication routing server 8. Routing information 6 indicates which pairs of authentication servers III register with each other so that they can directly authenticate each other without a third party.

Routing query 7 sent from client II to authentication routing server 8 consists of the identity of client II (which includes the identity of authentication server III with which the client registers), the authentication policy of application server I (which the client acquired by querying (policy query 4) policy server 3), and, if desired or necessary, the policy specified by client II (a client policy is not necessary for operation of the present invention).

Three possible examples of policies specified by client II are:

EXAMPLE 1

"<Realm X><Realm R1>*".

This policy states that:

1. The first two realms in the authentication path must be realm X and realm R1; and
2. The asterisk (*) means "zero or more realms".

EXAMPLE 2

"<Realm X>* (EXCEPT R1)".

This policy states that:

1. The first realm in the authentication path must be realm X; and
2. Zero or more realms, except realm R1, can be placed after realm X in the authentication path.

EXAMPLE 3

"<Realm X>*<Realm Y>".

This policy states that:

1. The first realm in the authentication path must be realm X;
2. The last realm in the authentication path must be realm Y; and
3. Zero or more realms can be placed between realm X and realm Y in the authentication path.

Authentication routing server 8 stores authentication routing information 6 from authentication servers III, constructs and sends replies (routing referral 9) in response to routing query 7 from client II.

Routing referral 9 is a reply from authentication routing server 8 to client II. Routing referral 9 contains either:

(a) one or more authentication paths, which meet application server I's authentication policy and client II's policies in routing query 7 of client II, or (b) a referral to another authentication routing server, or (c) an error message which indicates no authentication path which meets application server I's authentication policy and client II's policies in routing query 7 of client II can be found. Note, routing query 7 and routing referral 9 constitute the protocol between client II and authentication routing serve 8.

Policy library 10 is a set of application programming interfaces and their implementations, which allow application server I and client II to access policy model 1 and policy servers 3 in the following way:

(a) allows application server I to formally specify its authentication policy according to policy model 1 and sends the formal specification to policy server 3;

(b) allows client II to send policy query 4 to policy server 3 to query an authentication policy of application server I and to receive server policy 5 (the reply to the query) and to interpret server policy 5 according to policy model 1.

Routing library 11 is a set of application programming interfaces and their implementations, which allow authentication servers III and client II to use authentication routing servers 8 in the following way:

(a) allows authentication servers III to send authentication routing information 6 to authentication routing servers 8;

(b) allows client II to send routing query 7 to authentication routing server 8 for an authentication path which meets the authentication policy of application server I and policies specified by client II (if desired) and to receive the reply (routing referral 9).

Figure 3:
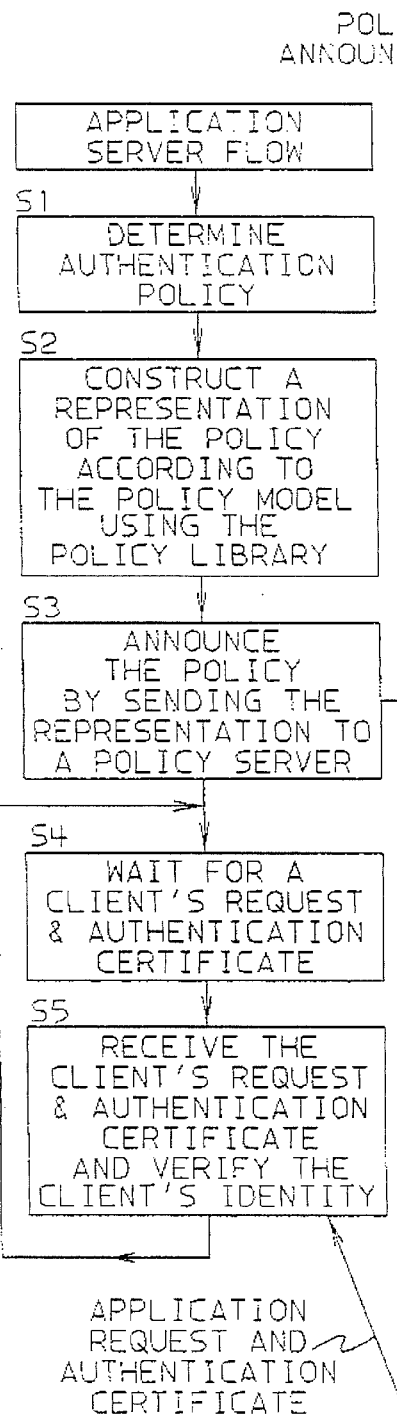
FIG. 3 illustrates a flow diagram in accordance with the present invention.
Figure 3:
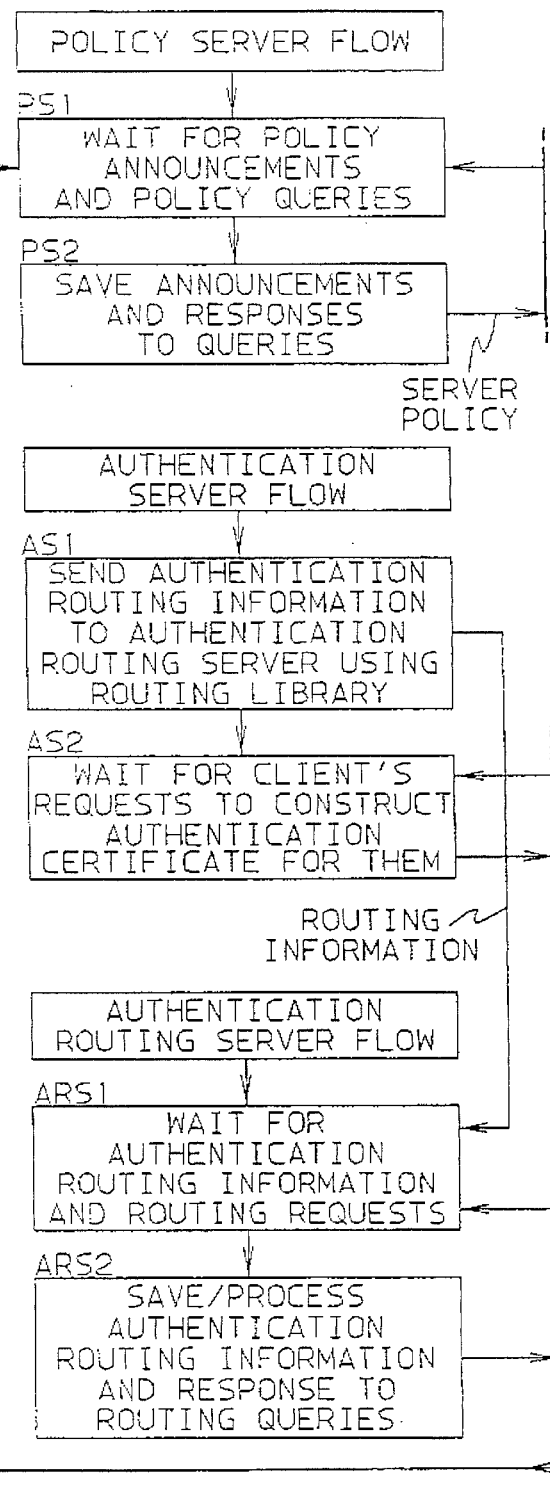
Figure 3B:
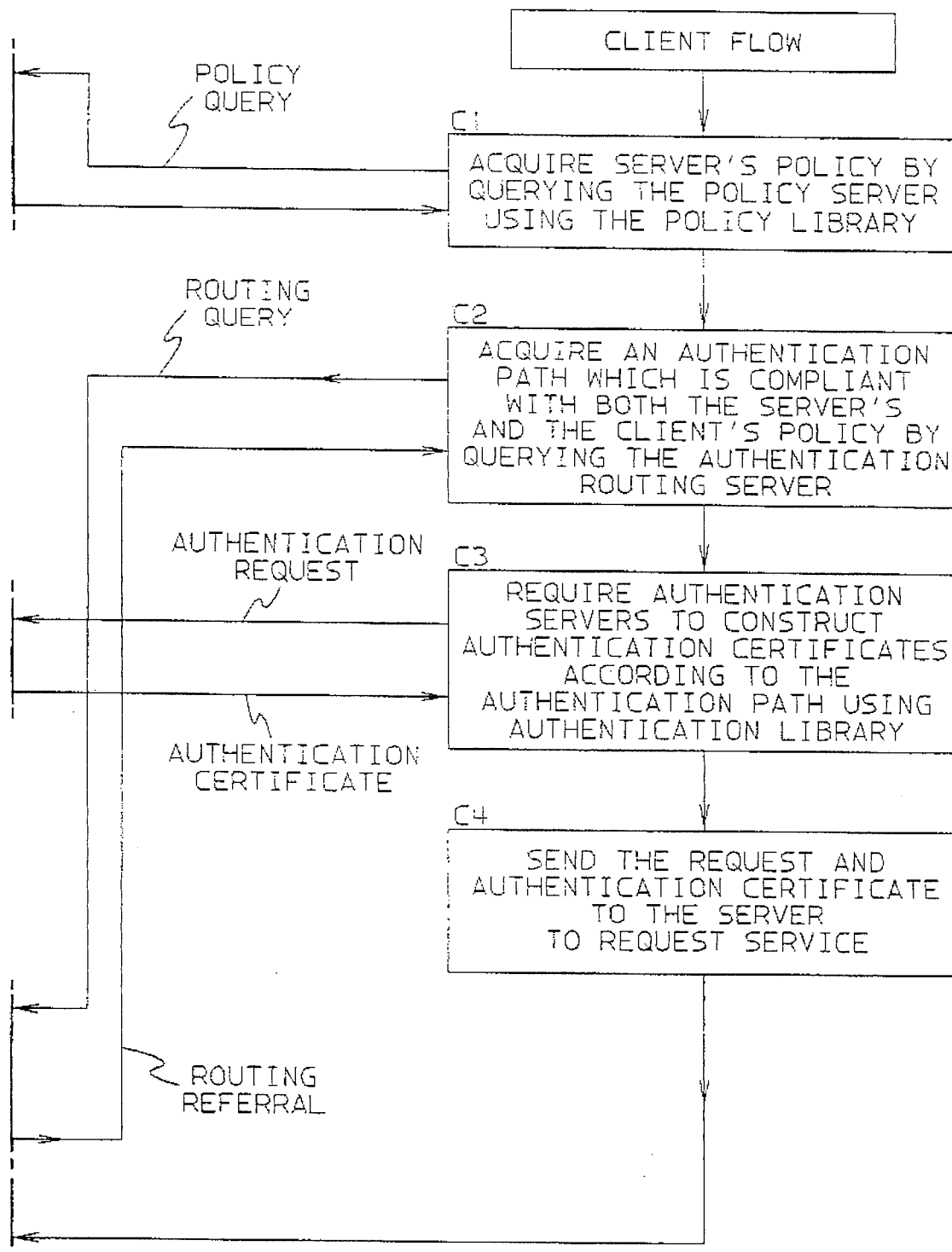

Referring next to FIG. 3, there is illustrated a flow diagram in accordance with the operation of the present invention, subdivided into five flow charts showing the flow of application server I, client II, policy server 3, authentication server III, and authentication routing server 8.

Each of servers I, III, 3 and 8, and client II acts asynchronously until it needs to interact with the others, whence synchronization is achieved through sending/waiting-receiving messages as is well known in the art. Note that within the flow diagram illustrated in FIG. 3, solid lines indicate flow of control, while dashed lines indicate flow of messages.

The process within application server III begins with step s1, wherein the authentication policy of application server I is determined. Thereafter, in step s2, using policy library 10, application server I constructs a representation of its authentication policy according to the syntax and semantic rules of policy model 1.

Next, in step s3, application server I announces its authentication policy by sending policy announcement 2 to policy server 3. Thereafter, application server I waits at step s4 for application request VI and authentication certificate V from client II.

Once application request VI, including authentication certificate V, from client II is received, application server I verifies the identity of client II through authentication certificate V and then processes request VI by client II.

After processing request VI, application server I may either terminate its operation or return to step s4 to wait for another request and authentication certificate.

The process within policy server 3 begins at step ps1 wherein policy server 3 waits for policy announcement 2 from application server I (see step s3 above), and also waits for policy query 4 from client II (see step c1 below). Thereafter, at step ps2, if policy server 3 received policy announcement 2 at step ps1, it stores announcement 2 in its database; if policy server 3 received policy query 4 at step ps1, it sends server policy 5 to client II in response to policy query 4.

The process within authentication server III begins at step as 1, wherein using routing library 11, authentication server III sends authentication routing information 6 to authentication routing server 8 (see step ars1 below). Thereafter, at step as2, authentication server III waits for authentication request IV from client II (see step c3 below), and constructs and sends authentication certificate V to client II. Note, if authentication certificate V cannot be constructed by authentication server III, an error message will be send to client II.

The process within authentication routing server 8 begins at step ars1, wherein authentication routing server 8 waits for authentication routing information 6 from authentication server III (see step as1 above) and also waits for routing query 7 from client II (see step c2 below). Thereafter, at step ars2, if authentication routing server 8 received routing information 6 at step ars1, it stores routing information 6 in its database; if authentication routing server 8 receives routing query 7 at step ars1, it uses the routing information in its database to construct and send routing referral 9 to client II.

The process within client II begins at step c1, wherein using policy library 10, client II sends policy query 4 to policy server 3 (see steps ps1 and ps2 above) for the authentication policy of application server I. Next, at step c2, using routing library 11, client II sends routing query 7 to authentication routing server 8 (see step ars2 above) for an authentication path which is compliant with the authentication policy of application server I and, if necessary or desired, policies specified by client II. Next, at step c3, using authentication library VII, client II acquires authentication certificate V according to the authentication path acquired in step c2 from authentication server III (see step as2 above). Then, at step c4, client II sends application request VI along with received authentication certificate V, acquired in step c3, to application server I to request service.

The present invention may be incorporated into OSF/DCE (Open Software Foundation's Distributed Computing Environment) as an amendment to its security framework. The present invention may also be used in any large distributed system whose computing resources and user accounts are partitioned into autonomous realms and/or hierarchies of realms. Examples are electronic banking systems, larger scale multimedia systems, electronic library systems, or any electronic information/service on-demand system in general.

Although the present invention and its advantages have been described in detail, it should be understood that various changes, substitutions and alterations can be made herein without departing from the spirit and scope of the invention as defined by the appended claims.

For instance, those skillful in the art will know from the above description that the invention can be an amendment to the Kerberos Network Authentication Service (please refer to the Kerberos Network Authentication Service (V5) reference noted above), which uses secret-key encryption/decryption; those skillful in the art will also know the invention can be applied to network authentication services that use public-key encryption/decryption.

What is claimed is:

1. In a distributed computing system wherein individual computers are linked together by a communication network, a method for inter-realm authentication comprising the steps of:

a) requesting, by a client, an application server policy for an application server from a policy server;

b) when a policy reply from the policy server contains an authentication policy of the application server, requesting, by the client, an authentication path to the application server from an authentication routing server;

c) determining, by the authentication routing server, whether the authentication path is compliant with the authentication policy and authentication routing information;

d) when the authentication path is compliant with the authentication policy and the authentication routing information, providing, by the authentication routing server, verification of the authentication path to the client;

e) upon receiving the verification of the authentication path, requesting, by the client, an authentication certificate from an authentication server;

f) providing, by the authentication server, the authentication certificate to the client, wherein the authentication certificate is based on the authentication path;

g) upon receiving the authentication certificate, sending, by the client, a request to the application server, wherein the request includes the authentication certificate; and h) verifying, by the application server, the client based on the authentication certificate.

2. The method as recited in claim 1 wherein step (b) further comprises the steps of:

determining, by the policy server, whether a policy database contains the authentication policy for the application server; and when the policy database contains the authentication policy, generating the policy reply to include the authentication policy.

3. The method as recited in claim 2 wherein step (b) further comprises the step of:

generating the policy reply to include a message to address another policy server when the policy database does not include the authentication policy.

4. The method as recited in claim 2 wherein step (b) further comprises the of:

generating the policy reply to include an error message when the policy database does not include the authentication policy.

5. The method as recited in claim 1 wherein step (d) further comprises the steps of:

when the authentication path is not compliant with the authentication policy and the authentication routing information, providing, by the authentication routing server, an error message or a referral message to another authentication routing server.

6. The method as recited in claim 1 further comprises the steps of:

providing, by the client, a client authentication policy to the authentication routing server; and determining, by the authentication routing server, whether the authentication path is compliant with the authentication policy, the client authentication policy, and the authentication routing information.

7. An inter-realm authentication apparatus for use in a distributed data processing system, the inter-realm authentication apparatus comprises:

an authentication server that includes:

authentication information database for storing authentication routing information of the distributed data processing system;

processing means, operably coupled to the authentication information database, for providing the authentication routing information upon request and for processing certificate requests by clients affiliated with the distributed data processing system;

a policy server that includes:

policy database for storing authentication policies of application servers;

processing means, operably coupled to the policy database, for entering an authentication policy of an application server into the policy database and for processing requests for policy information by the clients; and an authentication routing server that is operably coupled to the authentication server and the policy server, wherein the authentication routing server, upon an authentication path request from a client to a target application server, determines whether the authentication path is compliant with the authentication routing information and the authentication policy of the target application server.

8. The apparatus of claim 7, wherein the policy server further comprises:

client policy database for storing client determined authentication policies.

9. A computer readable storage medium for storing program instructions that, when read by at least one computer, causes the at least one computer to providing inter-realm authentication, the computer readable storage medium comprises:

first storage means for storing program instructions that cause the at least one computer to receive an application server policy request for an application server from a client;

second storage means for storing program instructions that cause the at least one computer to generate a policy reply, and, when the policy reply contains an authentication policy of the application server, to receive an authentication path request between the application server and the client from the client;

third storage means for storing program instructions that cause the at least one computer to determine whether the authentication path is compliant with the authentication policy and authentication routing information;

fourth storage means for storing program instructions that cause the at least one computer to provide verification of the authentication path to the client when the authentication path is compliant with the authentication policy and the authentication routing information;

fifth storage means for storing program instructions that cause the at least one computer to receive a request from the client, in response to the verification of the authentication path, for an authentication certificate; and sixth storage means for storing program instructions that cause the at least one computer to provide the authentication certificate to the client, wherein the authentication certificate is based on the authentication path.

\* \* \* \* \*